United States Patent
Saunders

(10) Patent No.: US 8,348,672 B2
(45) Date of Patent: Jan. 8, 2013

(54) INSTRUCTOR PROFICIENCY WITH TRAINING ROUTINES USING A MULTIMEDIA FEEDBACK TOOL

(75) Inventor: Mike Saunders, Kingwood, TX (US)

(73) Assignee: MPS Systems Corps, Kingwood, TX (US)

( * ) Notice: Subject to any disclaimer, the term of this patent is extended or adjusted under 35 U.S.C. 154(b) by 1222 days.

(21) Appl. No.: 12/132,496

(22) Filed: Jun. 3, 2008

(65) Prior Publication Data

US 2009/0298028 A1 Dec. 3, 2009

(51) Int. Cl.
*G09B 19/00* (2006.01)
(52) U.S. Cl. ........ 434/250; 434/247; 434/254; 434/255; 73/379.01; 473/131; 482/57
(58) Field of Classification Search .................. 434/250, 434/258, 307 A, 247; 482/57
See application file for complete search history.

(56) References Cited

U.S. PATENT DOCUMENTS

| 7,128,649 B2 * | 10/2006 | Nobe et al. ....................... 463/23 |
| 2008/0096727 A1 * | 4/2008 | Lee et al. ........................... 482/8 |

* cited by examiner

*Primary Examiner* — Xuan Thai
*Assistant Examiner* — Banafsheh Hadizonooz
(74) *Attorney, Agent, or Firm* — Patterson & Sheridan LLP

(57) ABSTRACT

Embodiments of the invention may be used to both train and test instructor proficiency with a group exercise training routine. In a training mode, the graphical user interface may display visual cues indicating upcoming transitions from one activity to another. In response, the user may perform an action (e.g., clicking a button with a mouse cursor) to select the transition at the appropriate time. In a testing mode, the graphical user interface may display an indication of whether the correct selections are made, as well as made at the right time. This approach allows the user to rapidly develop substantial proficiency with the exercise routine.

28 Claims, 11 Drawing Sheets

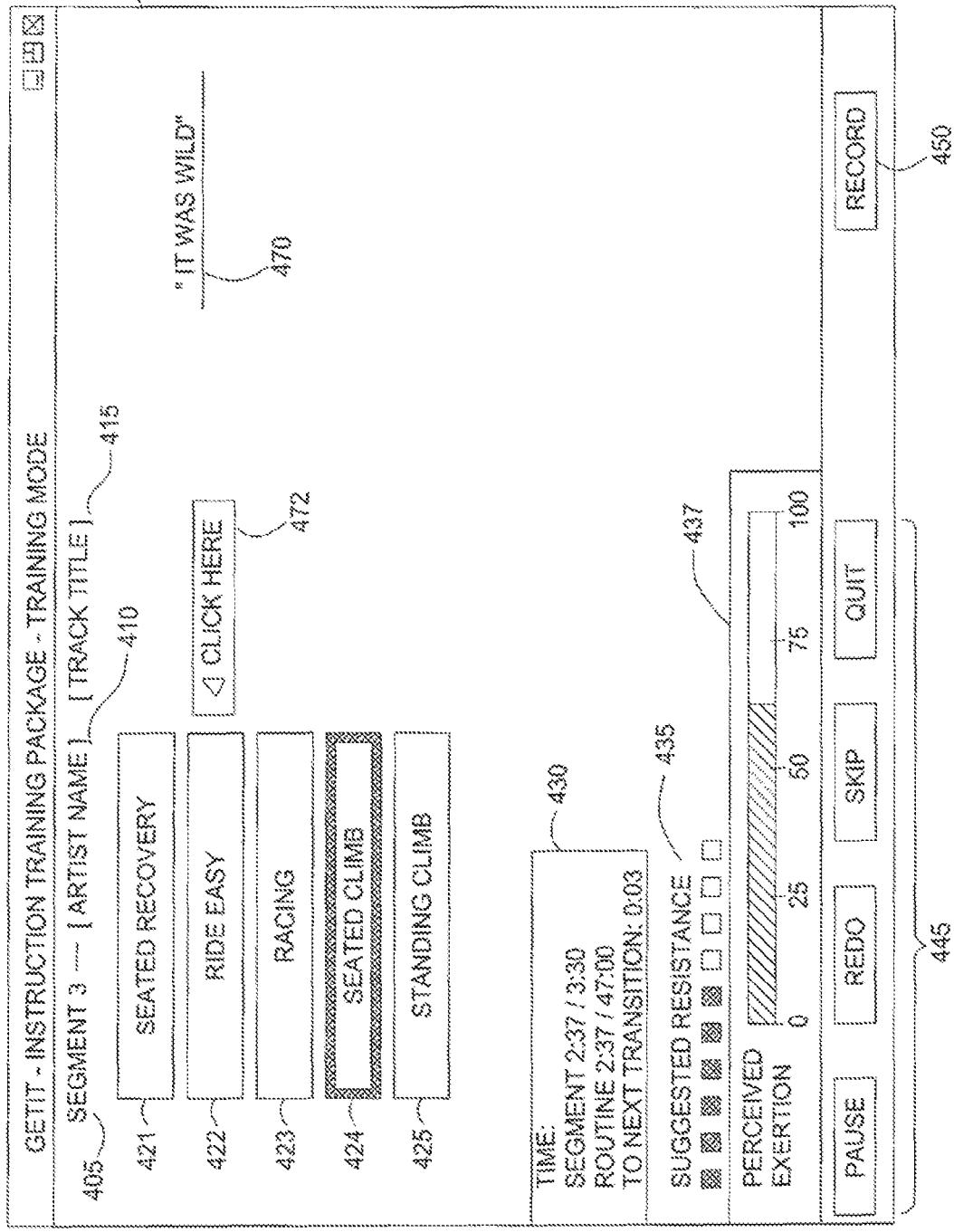

INSTRUCTOR PROFICIENCY WITH TRAINING ROUTINES USING A MULTIMEDIA FEEDBACK TOOL

BACKGROUND OF THE INVENTION

1. Field of the Invention

Embodiments of the present invention generally relate to techniques used to teach a user elements of a training routine. More specifically, embodiments of the invention relate to techniques for improving instructor proficiency with a group exercise routine using a multimedia feedback tool.

2. Description of the Related Art

As is well known, regular exercise is critical to an individual's overall health and well-being. One popular form of exercise is a group exercise class, and group exercise classes are widely available at fitness center or group fitness program companies and have been developed around a wide variety of different forms of exercise. For example, group exercise classes have been developed for cycling (sometimes referred to as "spinning"), weight-training, yoga, pilates, general aerobics, dance, water aerobics, as well for specialty classes designed around a particular exercise, brand, or piece of equipment (e.g., step-aerobics).

Typically, group exercise classes run for roughly an hour in length during which an instructor leads a group of participants through a particular sequence of exercises. That is, regardless of the particular type of exercise, an instructor leads the class by directing the actions of the group. Generally, the instructor leads the class though a warm-up phase, a core exercise phase, and a cool-down phase. Of course, this is just a general pattern and the particular activity for a given class depends on the type of exercise being performed. Additionally, group exercise classes frequently include a musical score, where the music is selected to match the activity being performed at any given time (e.g., the music selected for intense cardiovascular activity is likely to be different form the music selected for a cool-down or stretching phase of a group exercise class).

One approach for the actual sequence of routines performed by the instructor during a group exercise class is relatively freeform, where the instructor sets the tone, pace, or aggressiveness of the activity engaged in during a class according to the desires of the instructor or feedback from class members. In such a case, the instructor may pick the music to use during the routine and lead class participants through a reasonable sequence of exercises over the course of a class. Frequently however, the instructor may conduct a group exercise class according to a more specific choreography. For example, a given fitness center or group fitness program company may wish to offer the same program at many different locations, and often such programs are the result of careful planning and research into the kinesiology of a particular exercise method. Similarly, the choreography for a given exercise routine may be tailored to suit a particular fitness level expected for class participants. The choreography of such a routine may include a sequence of transitions for the instructor to perform, along with a set of musical tracks for the instructor to play during the exercise class. In such cases, it is important for the instructor to understand the routine, the timing of transitions from one element to the next, and how long (or how much energy) participants should use in performing any particular activity included in the routine choreography.

SUMMARY OF THE INVENTION

One embodiment of the invention includes a computer-implemented method for improving user proficiency with a choreographed training routine. This method may generally include a step of receiving a selection of a choreographed training routine and a step of retrieving the choreographed training routine. The routine itself may specify one or more audio tracks and, for each audio track, a plurality of time indexes each indicating when a transition should occur from one specified activity to another specified activity as part of the choreographed training routine. This method may also include generating a graphical user interface display presenting a list of each activity specified by the choreographed training routine and initiating playback of the first musical track. During playback, prior to reaching a time index corresponding to each transition, a visual cue may be displayed to provide the user with an indication of the upcoming transition.

Advantageously, embodiments of the invention may be used to both train and test instructor proficiency with a group exercise training routine. In a training mode, the graphical user interface may display visual cues indicating upcoming transitions from one activity to another. In response, the user may perform an action (e.g., clicking a button with a mouse cursor) to select the transition at the appropriate time. In a testing mode, the graphical user interface may display an indication of whether the correct selections are made, as well as made at the right time. Further, the testing mode may also be used to determine an overall measure of user proficiency with a training routine, as well as to identify portions of the routine where the user may need additional training in order to become efficient with that routine.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-4C illustrate a set of example graphical user interface screens for improving instructor proficiency with a training routine, according to one embodiment of the invention.

DETAILED DESCRIPTION OF THE PREFERRED EMBODIMENTS

Figure 1:
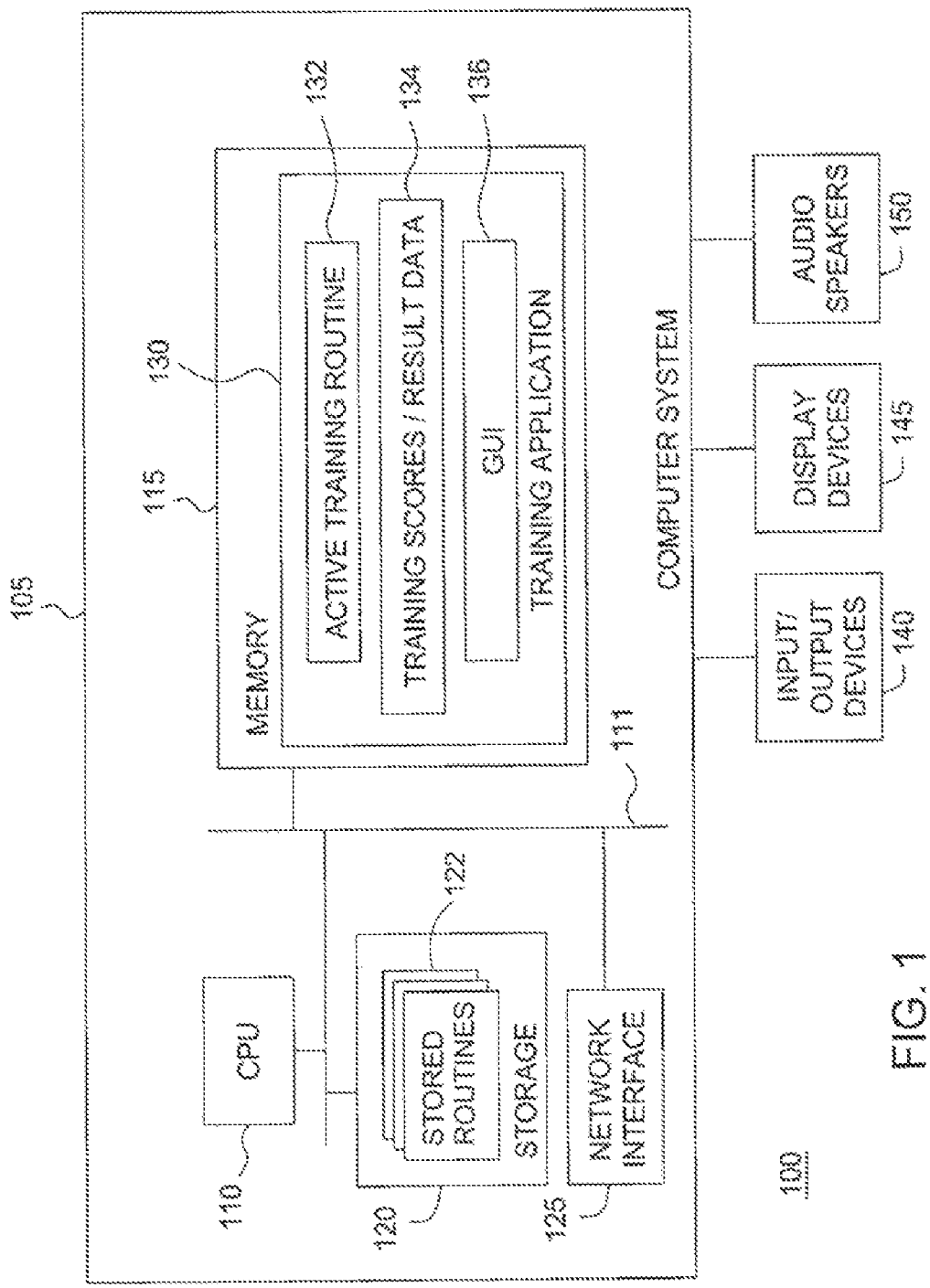
FIG. 1 is a block diagram illustrating an example computing environment, according to one embodiment of the invention.

As described above, group exercise routines offered by a fitness center or group fitness program company may be the result of careful planning and research into the kinesiology of a particular exercise method. Doing so allows a fitness center or group fitness program company to offer group exercise classes designed to maximize the effectiveness of a given routine, provide customized routines to target individuals with different fitness levels, and provide customers with a consistent experience across different instructors and locations. At the same time, such a choreographed routine may include multiple musical tracks, each with a defined sequence of transitions from one form of exercise to others, different levels of exertions, and different settings for any equipment used in the routine. For example, consider a choreography for a cycling (or "spinning") group exercise class, such a choreography may specify transitions between different riding positions (e.g., riding, seated, or standing) transitions for resistance settings on the cycling equipment, and transitions for a riding pace at any given moment. Despite this complexity, the instructor requires a high-degree of familiarly or proficiency with the timing and sequence of the transitions to effectively conduct a group exercise class. Typically however, an instructor is simply provided with a written choreography describing a sequence of musical tracks, and time indexes into each track indicating what (and when) transitions should occur from one activity to another. This leaves it to the instructor to correctly interpret the choreography as well as to memorize the routine with sufficient proficiency to lead a group exercise class, often a difficult and tedious task.

Embodiments of the invention may be used to improve instructor proficiency with a training routine. That is, embodiments of the invention may be used to "train-the-trainer" elements of a choreographed exercise routine composed for a group exercise class. In a particular embodiment, a user may be presented with a graphical user interface along with a playback of the audio tracks included with a given routine. While each track is played, the graphical user interface may display visual cues indicating upcoming transitions from one activity to another. In response, the user may perform an action (e.g., clicking a button with a mouse cursor) to select a transition at the appropriate time. For example, the display may present a list of different actions that may be performed during the exercise routine. While the music plays, a visual cue may display what song lyrics will play at the next transition, providing the user with a hint as to when the next transition is to occur. Or as another example, a visual cue may fade in a few seconds before the moment the user should click on a particular transition. In such a case, the position where the cue fades-in may provide an indication of what transition should be selected. Further, the interface may highlight the list element representing the appropriate transition when playback reaches those lyrics. Once reached, the user clicks on the appropriate transition from the list. In response, the system may present a visual cue indicating how close to the specified time the user selected the item from the list. Further still, the cue may include video or animation or a separate audio track. For example, a visual cue may be animated so as to appear to move towards the correct transition. In such a case, the cue could include a timer displaying a countdown to the next transition. This approach allows the user to rapidly develop substantial proficiency with the choreography of a given group exercise routine.

Further, the graphical interface may also be configured to test user proficiency with a given routine. For example, in one embodiment, the interface may display a list of transitions while playing back an audio track included in a choreographed routine. While the audio plays, the user selects transitions from the list corresponding to the transitions in the routine, and a proficiency score may be calculated to reflect how accurately the user selects the transitions specified by the choreography. For example, if the user selects the wrong transition (or the right transition at the wrong time) then a deduction may be made to a proficiency score. Alternatively, (or additionally) the proficiency score may be determined by awarding points each time the user selects the correct transition at the correct time (or within a small window before or after (e.g., ±3 seconds), or some combination of the two. Doing so allows the user to identify portions of the routine which have been mastered and which portions require further training. Further, testing user proficiency allows a fitness center or group fitness program company to evaluate how well an instructor understands the choreography specified by routines they are expected to use in leading a group exercise class.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other examples of media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Further, although embodiments of the invention are described herein using cycling, or "spinning" as an exemplary group exercise, one of ordinary skill in the art will recognize that embodiments of the invention may be adapted for use with a variety of group exercise classes. For example, group exercise routines may be developed for, among others, weight-training, yoga, pilates, aerobics, dance, water aerobics, as well for specialty classes designed around a particular exercise, brand, or piece of equipment. Further still, embodiments of the invention may be adapted for other group activities where a group of participants follow an instructor through a choreographed sequence of actions.

FIG. 1 is a block diagram illustrating an example computing environment 100, according to one embodiment of the invention. As shown, the computing environment 100 includes a computer system 105 generally having a central processing unit (CPU) 110, memory 115, storage 120, and a network interface 125, connected by a bus 111. Computer system 105 is included to be representative of existing computer systems, e.g., desktop computers, server computers, laptop computers, tablet computers, and the like. However, one of ordinary skill in the art will recognize that computer system 105 is merely an example, and that embodiments of the present invention may be implemented using other computing systems, regardless of whether the computer systems are complex multi-user computing systems, such as a cluster of individual computers connected by a high-speed network, single-user workstations, or network appliances lacking non-volatile storage, or video gaming consoles. Further, the software applications described herein are not limited to any currently existing computing environment or programming language, and may be adapted to take advantage of new computing systems as they become available. Illustratively, computer system 105 is connected to one or more input devices 140, display devices 145, and audio speakers 150. Example of input devices 140 include a keyboard and mouse, other devices may be used (e.g., a touch screen or video game controller). Display device 145 generally represents a computer monitor such as a CRT or LCD display.

CPU 110 represents one or more programmable logic devices that perform all the instruction, logic, and mathematical processing in computer system 105. CPU 110 may represent a single CPU, multiple CPUs, a single CPU having multiple processing cores, and the like. Storage 120 stores application programs and data for use by computer system 105. Examples of storage 120 include hard-disk drives, flash memory devices, optical media and the like. Computer system 105 may be connected to a data communications network (e.g., a local area network, which itself may be connected to other networks such as the internet) over network interface 125.

As shown, storage 120 includes a collection of stored routines 122. In one embodiment, each stored routine 122 defines a different choreographed exercise routine for a group exercise class. For example, each stored routine 122 may identify a sequence of musical tracks along with time indexes into each track indicating what (and when) transitions should occur from one activity to another as part of a given stored routine 122. Thus, a stored routine 122 representing the choreography for a cycling group exercise class could specify transitions between different riding positions (e.g., riding seated or standing) transitions for resistance settings on the cycling equipment, and transitions for a riding pace at any given moment. In one embodiment, the stored routines 122 may be composed according to a formal mark-up language (e.g., XML).

Memory 115 is representative of a variety of different memory devices, including random access memory (e.g., programmable or flash memories, read-only memories, SDRAM DDR, DDR2, memory banks, etc.). Illustratively, FIG. 1 shows memory 115 storing an active training routine 132, training scores and/or training result data 134, and a graphical user interface (GUI) 136. In one embodiment, the training application 130 may be configured to present elements of GUI 136 on display devices 145 as well as play the musical tracks included in the active training routine 132 over audio speakers 150, in order to train an instructor on the elements of the active training routine 132 and/or to test the instructor's proficiency with the elements in the active training routine 132. In either case, the results of training or testing the proficiency of a given user may be stored as scores and results data 134.

Figure 2:
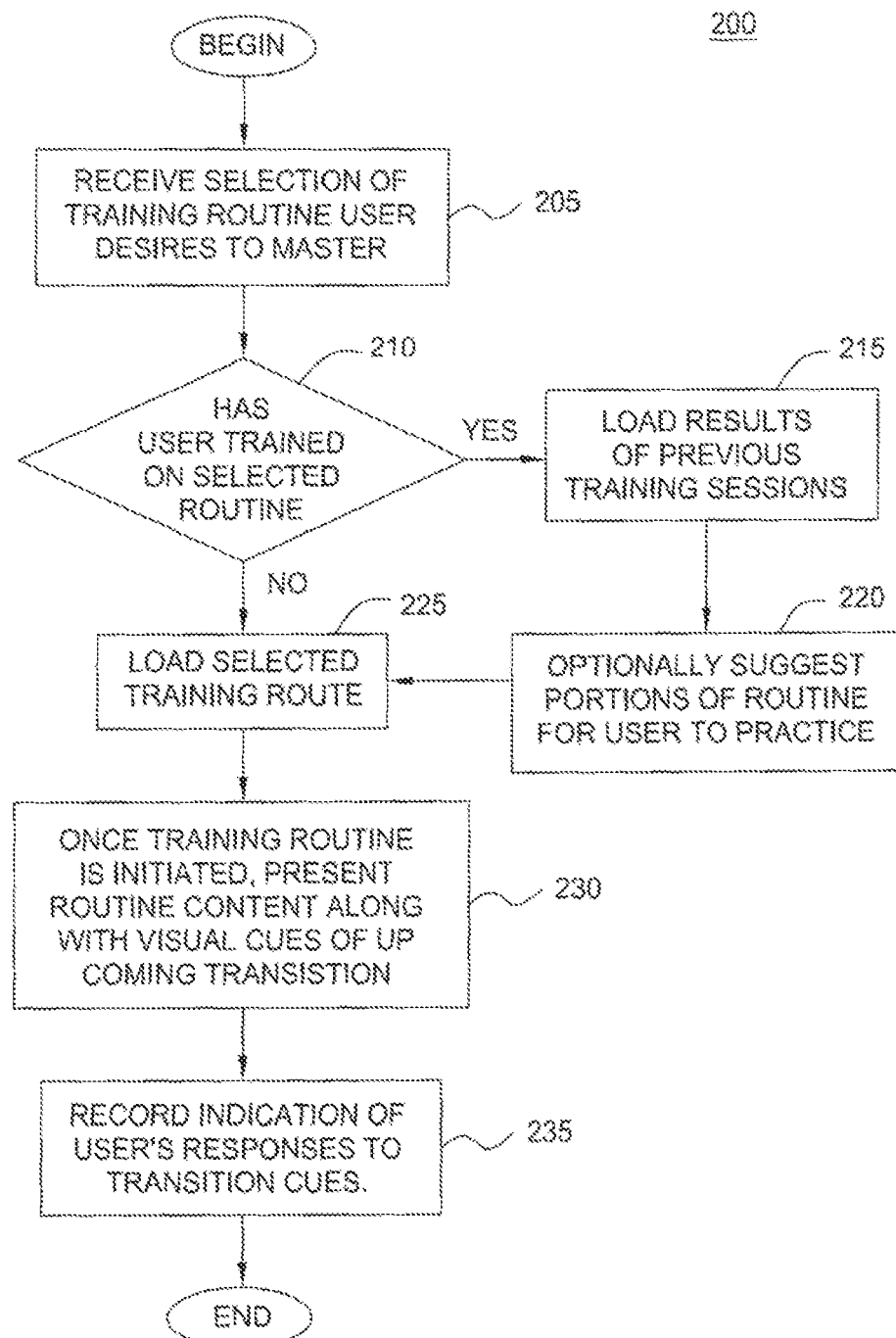
FIG. 2 illustrates a method for improving instructor proficiency with training routines using a multimedia feedback tool, according to one embodiment of the invention.

FIG. 2 illustrates a method 200 for improving instructor proficiency with a training routine using a multimedia feedback tool (e.g., the training application 130 of FIG. 1), according to one embodiment of the invention. The steps of method 200 are further illustrated in conjunction with a set of graphical user interface displays shown in FIGS. 4A-4C. As shown, the method 200 begins at step 205, where the training application 130 receives a selection of a training routine to use for a training session. For example, GUI 136 may be configured to display a list of the stored routines 122 and allow the user to select one of these routines from the list.

At step 210, the training application may determine whether the user has previously trained using the training routine selected at step 205. If so, at step 215 the training application may load the results from previous training sessions. In one embodiment, the training application may be configured to display the results of any such prior training sessions, allowing the user to identify portions of the routine which the user has (or lacks) a desired proficiency. Further, at step 220, the training application may suggest portions of the selected routine for the user to practice. At step 225, the training application may retrieve the selected routine from storage and set that routine as the active training routine 132. For example, the training application may identify a set of musical tracks included in the routine, verify that the musical tracks are available to play back as part of the training session (e.g., as audio files in storage 120), identify exercise types and transitions included in the routine, and generate a graphical interface display used to teach the elements of the selected routine to the user. At step 230, once the training routine is initiated, the training application may present elements of the training routine along with visual cues of transitions from one choreographed activity to another, as defined for that routine. At step 235, the application may record an indication of the user's responses to transition cues.

Figure 4A:
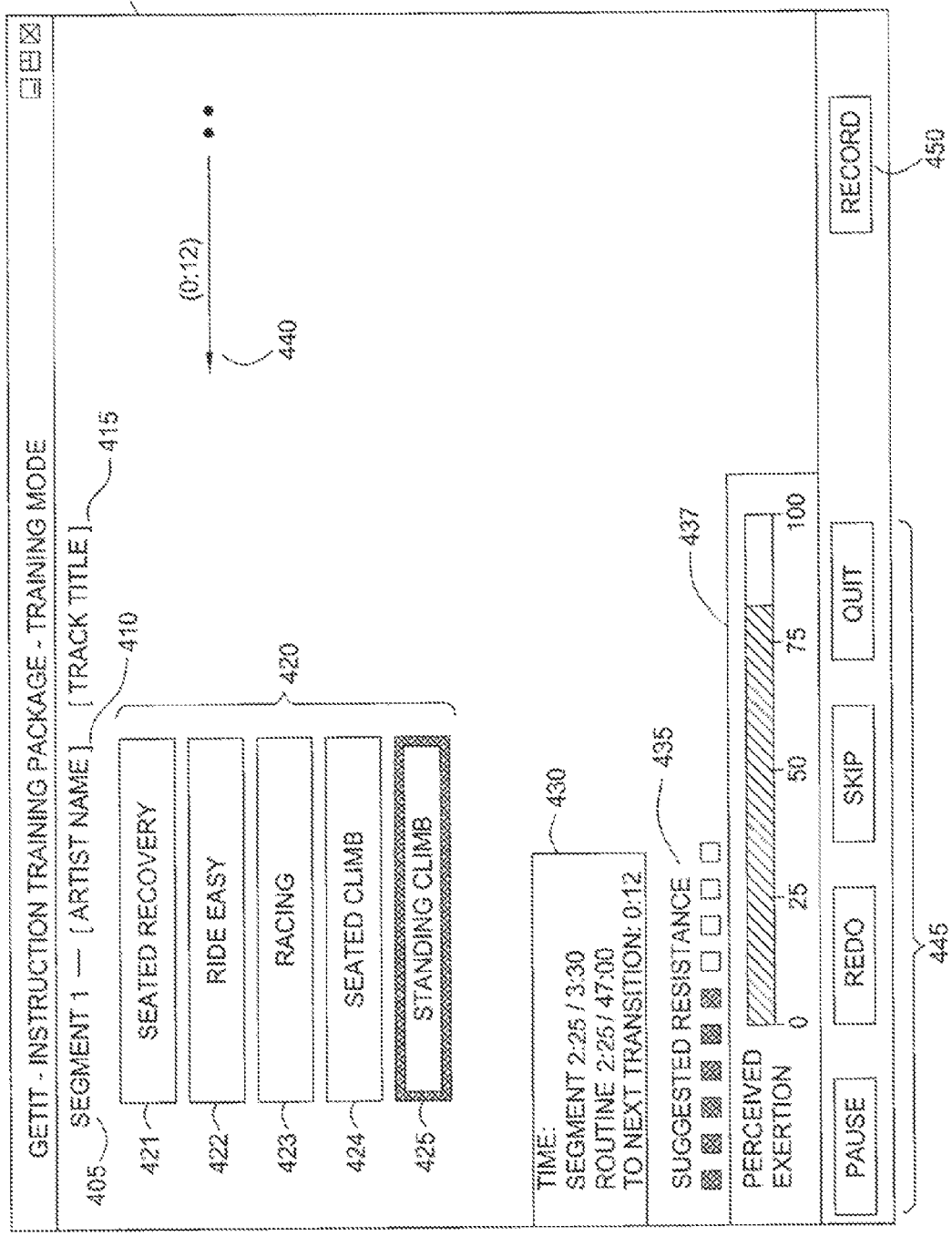
Figure 4B:
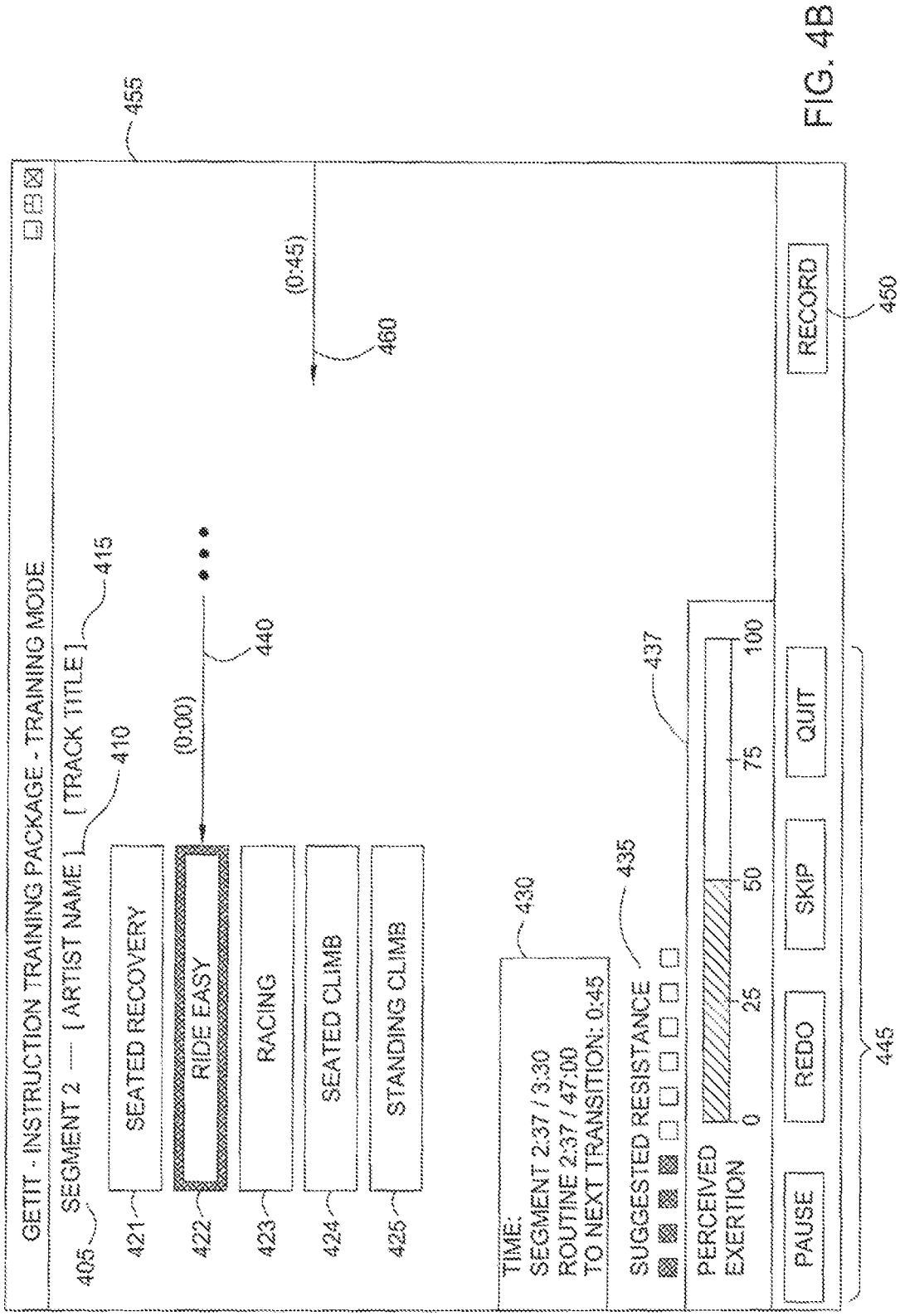

FIG. 4A illustrates a graphical interface screen 400 for improving instructor proficiency with a training routine, according to one embodiment of the invention. In this example, the training routine has been composed for a cycling (or "spinning") group exercise class. Of course, the particular selection and arrangement of graphical user depicted in FIGS. 4A-4C is only one example of such a screen adapted for use with a cycling group exercise class, and one of ordinary skill in the art will recognize that a broad variety of interface elements and configurations may be used.

Illustratively, screen 400 displays a current segment 405 of the training routine being presented to the user, along with an artist name 410 and track title 415 for the current segment

405. In addition, buttons 420 each display a different activity that may be performed as part of a cycling group exercise class. Specifically, the exercise activities include a button 421 for a "seated recovery" phase, a button 422 for a "ride easy" phase, a button 423 for a "racing" phase, a button 424 for a "seated climb" phase, and a button 425 for a "standing climb." As described above, the choreographed routine may describe a sequence of transitions from one activity to another, performed over the course of a number of musical tracks. Of course, one of ordinary skill in the art will recognize that the activities displayed by buttons 420 may be tailored to be appropriate for a particular group exercise routine. Additionally, screen 400 includes training routine control buttons 445 used to pause, redo, skip, or quit a given segment of a training session. A record button 450 may be used to toggle recording of the user's interaction with the interface 400.

As shown, button 425 is highlighted to indicate that this activity, a "standing climb," is the particular exercise activity that the instructor should tell class participants to perform at this point in the cycling routine. Additionally, screen 400 includes a visual cue 440 indicating the next transition defined for this cycling class. Illustratively, the visual cue 440 also includes the lyrics of the audio track for this segment that occur at the transition point. Further, the visual cue 440 includes a countdown timer specifying when the transition to the next exercise activity should occur. In one embodiment, the visual cue 440 may be animated to move across the screen 400 until it intersects with a button representing the activity to be transitioned to at the next transition. In this case, the visual cue 400 indicates the instructor should tell class participants to transition to a "ride easy" exercise activity after continuing to perform a high-exertion "standing climb" activity for another twelve seconds.

Additionally, screen 400 also shows a timer panel 430, a suggested resistance panel 435 and a perceived exertion panel 437. Illustratively, timer panel 430 provides a segment timer used to indicate how far the instructor has progressed through the current segment (in this example 2:25/3:30) a routine timer used to indicate how far the instructor has progressed through the complete routine (in this example 2:25/47:00), and a countdown timer indicating the amount of remaining until the next transition (in this case 0:12). The suggested resistance panel 435 and the perceived exertion panel 437 provide additional information related to the choreographed exercise routine. In this example of a cycling routine, a suggested resistance for pedal tension on an exercise bike and a suggested perceived exertion for a class participant. Of course, one of ordinary skill in the art will recognize that depending on the particular group exercise routine, a variety of information related to the routine could be presented by the interface screen 400.

FIG. 4B illustrates a second view of graphical interface screen 455 once the next transition has been reached (i.e. after twelve seconds have elapsed from the screen 400 of FIG. 4A). Illustratively, visual cue 440 has moved across the screen and shows a countdown timer of 0:00. Accordingly, the button 422 labeled "ride easy" is highlighted to indicate that the instructor should tell class participants to perform this activity at this point in the cycling routine. As shown, a visual cue 460 shows the next transition, the lyrics at that transition and what activity to switch to at that transition (namely, a "racing" activity). Also, the values displayed in the segment timer, the routine timer and the countdown timer of panel 430 have been incremented to reflect the passing of twelve seconds between FIG. 4A and FIG. 4B. And the suggested resistance panel 435 and perceived exertion panel 437 have been updated with values appropriate for the "ride easy" phase of the choreographed cycling routine.

FIG. 4C illustrates another example of a graphical interface screen 465 for improving instructor proficiency with a training routine, according to one embodiment of the invention. As shown, a screen 465 includes the buttons 421-425, indicating different exercise activities that may be performed as part of a cycling routine. Additionally, the screen 465 includes the timer panel 430, the suggested resistance panel 435, the perceived exertion panel 437, and other elements of the graphical interface screens first shown in FIGS. 4A and 4B. Illustratively, screen 465 shows the cycling routine at a point during the third segment (i.e., during the third musical track in this routine), with three seconds remaining before the next transition (as indicated by the countdown timer shown in timer panel 430). However, instead of displaying an animated visual cue (like visual cues 440 and 460 of FIGS. 4A and 4B), a visual cue 472 is displayed proximate to the button representing the appropriate transition activity. In this case, a transition from a seated climb (as indicated by the highlighted "seated climb" button 424) to a "ride easy" activity. Additionally, text fragment 470 displays a refrain which provides the song lyrics occurring at the time of the transition. The visual cue 472 simply says "click here" and includes an arrow indicating the "ride easy" button 422. In one embodiment, the visual cue 472 may appear when an upcoming transition is about to occur and disappears after the time designated for the transition. For example, the visual cue 472 may be configured to appear three seconds prior to, and following, an upcoming transition. Of course, when, and for how long, the visual cue 472 appears may be set as a matter of preference in an individual case.

Of course, the cues shown in FIGS. 4A-4C are examples of different cues that may be provided to indicate transition points, and embodiments of the invention may be adapted for use with these or a variety of other cues using audio, video, text, animations, etc., to provide hints regarding the transitions of a particular choreographed routine. Further, in one embodiment, what cues are shown or how they are animated or otherwise presented may be selected as a matter of user preference.

Figure 3:
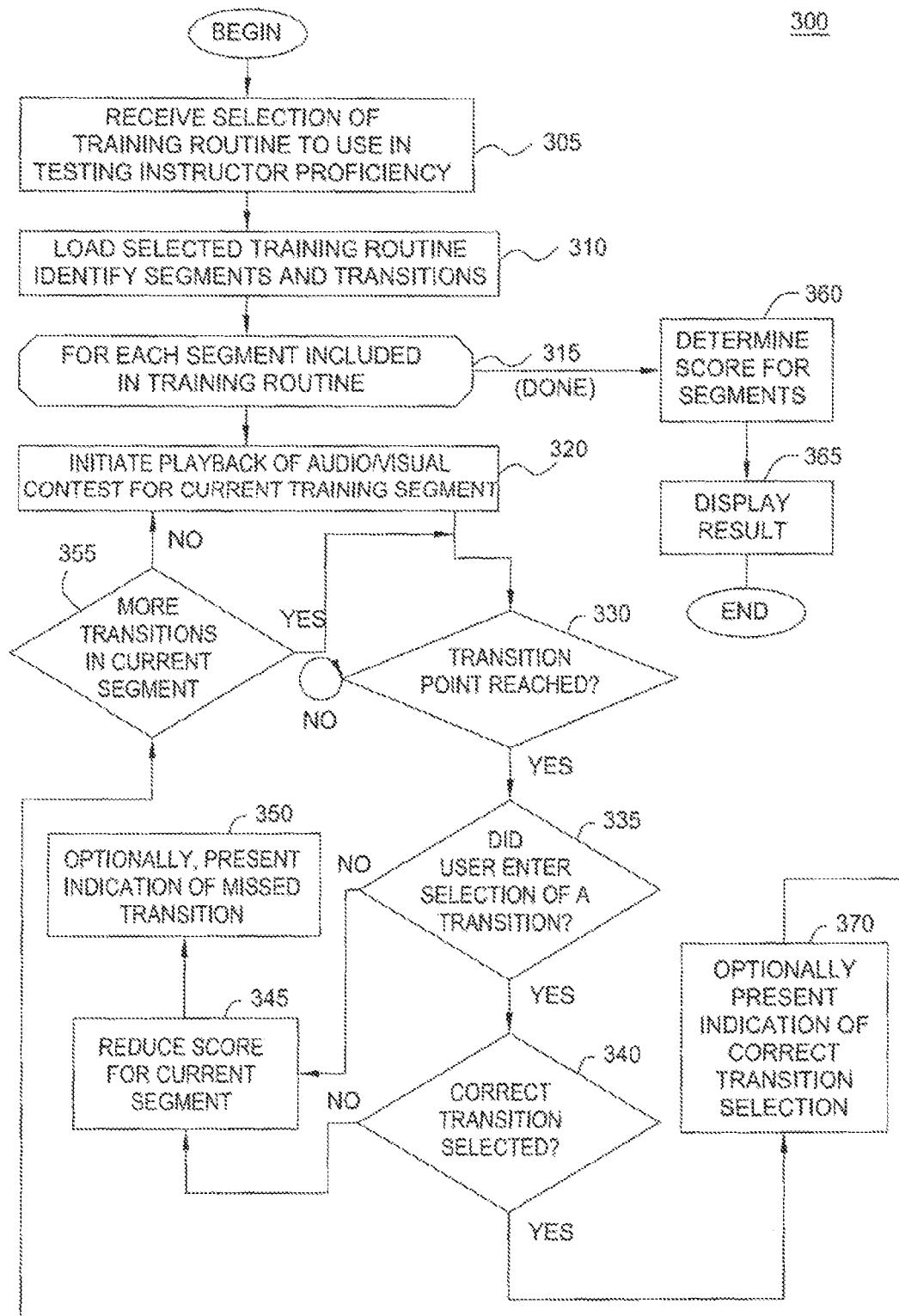
FIG. 3 illustrates a method for testing instructor proficiency with training routines using a multimedia feedback tool, according to one embodiment of the invention.

FIG. 3 illustrates a method 300 for testing instructor proficiency with training routines using a multimedia feedback tool, according to one embodiment of the invention. In contrast to the method 200 which an instructor may use to learn the transitions of a group exercise routine, method 300 may be used to test the proficiency of the instructor in following the transitions specified by a group exercise routine. That is, method 300 may be used to evaluate whether the instructor has, in fact, learned the transitions specified by the exercise routine. The steps of method 200 are further illustrated in conjunction with a set of graphical user interface displays shown in FIGS. 5A-5D. As shown, the method 300 begins at step 305, where the training application receives a selection of a training routine. At step 310, the training application may load the selected training routine and identify the segments and transitions included in that routine. For example, the training application may identify a set of musical tracks included in the routine, verify that the musical tracks are available to play back as part of the testing session (e.g., as audio files in storage 120), identify exercise types and transitions included in the routine, and generate a graphical interface display used to test the user's proficiency with the selected training routine.

At step 315, a loop begins that includes steps 320-355. For each pass through this loop, the user is presented with one of the segments of the routine. The user may then demonstrate proficiency with a segment by selecting the appropriate transitions (at the appropriate time) while the musical track is played. At step 320, the training application initiates playback of audio content for the current training segment. That is, the application begins playing the musical track associated with that segment. At step 330, while the musical track plays, the training application determines whether a transition point has been reached. For example, the training application may be configured to identify a time index for each transition in the current segment. Once a transition point is reached, at step 335, the training application may determine whether the user selected a transition within a specified time frame. If not, then at step 345, the training application may reduce the user's score for the current segment, and optionally, may present an indication of a missed transition at step 350. That is, if the user simply fails to select any transition within the time frame, the score for the current segment is reduced. In one embodiment, the reduction may be proportional to the number of transitions in the current segment. Thus, if the routine included twenty transitions, missing one would reduce the user's score by 5%. Thereafter, at step 355 if there are more transitions in the current segment, the method 300 returns to step 330 and awaits the next transition.

Returning to step 335, if the user selected a transition within the specified time frame, then at step 340, the training application may determine whether the user selected the correct transition. If so, at step 370, the training application may present an indication that the user selected both the correct transition within the specified time frame. If not, at step 345, the training application may resent an indication of the incorrect selection. Thereafter, if the current segment includes more transitions, the method 300 returns to step 330 and awaits the next transition. This process may continue for each transition within the current segment (i.e., for each transition specified by the routine choreography for the current musical track).

Figure 6:
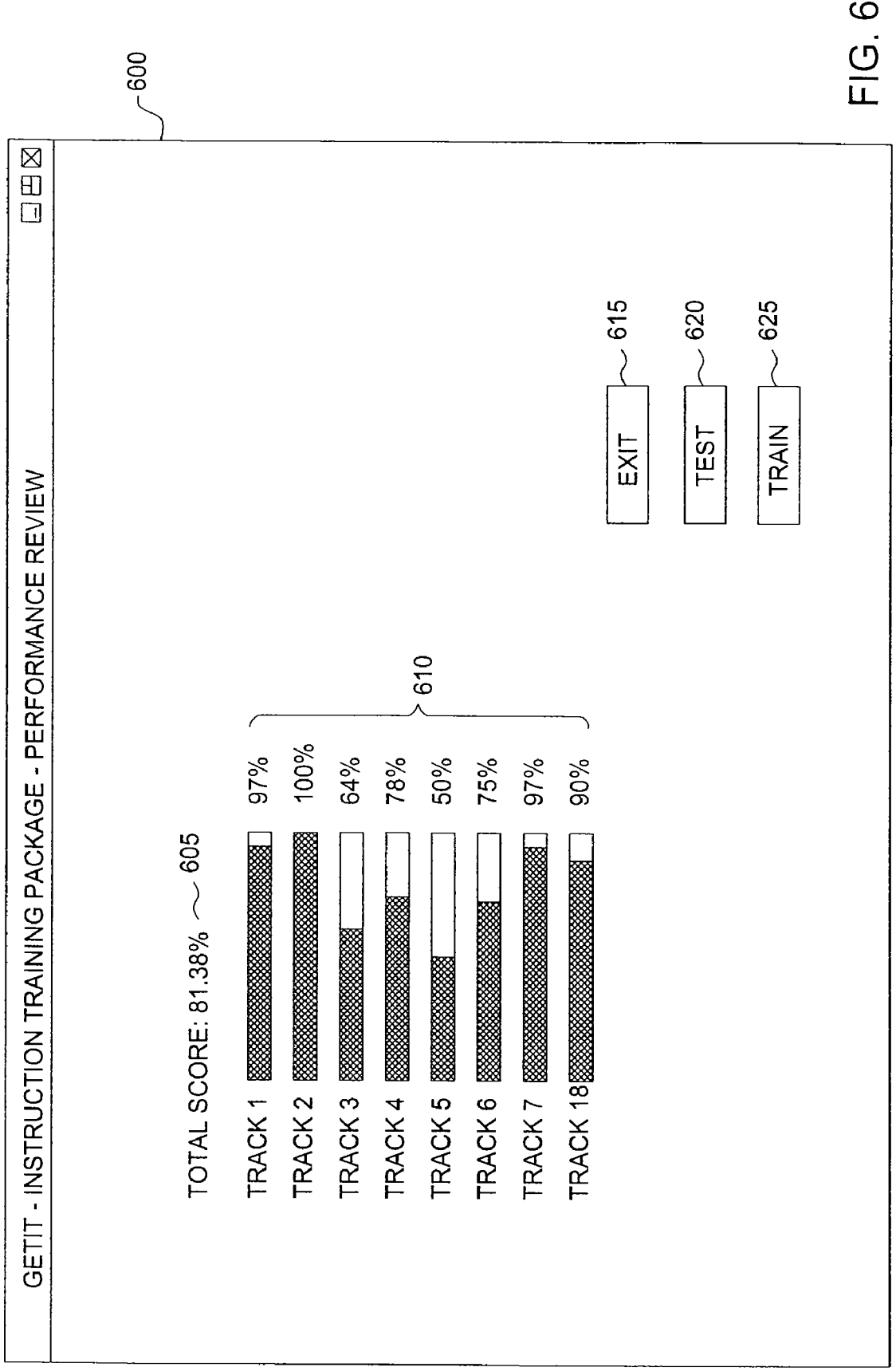
FIG. 6 illustrates an example graphical user interface screen presenting results of testing instructor proficiency with a training routine, according to one embodiment of the invention.

Once the user has completed testing on one or more of the segments included in a training routine, at step 360, the training application may determine a score for each segment completed by the user. And at step 365, the scores may be displayed. FIG. 6, discussed below, presents an example graphical user interface screen displaying test results testing instructor proficiency with a training routine.

FIGS. 5A-5D illustrate a set of example graphical user interface screens for testing instructor proficiency with a training routine, according to one embodiment of the invention. Of course, the particular selection and arrangement of graphical user depicted in FIGS. 5A-5D is only one example of such a screen adapted for use with the example of a cycling group exercise class, and one of ordinary skill in the art will recognize that a broad variety of interface elements and configurations may be used.

Figure 5A:
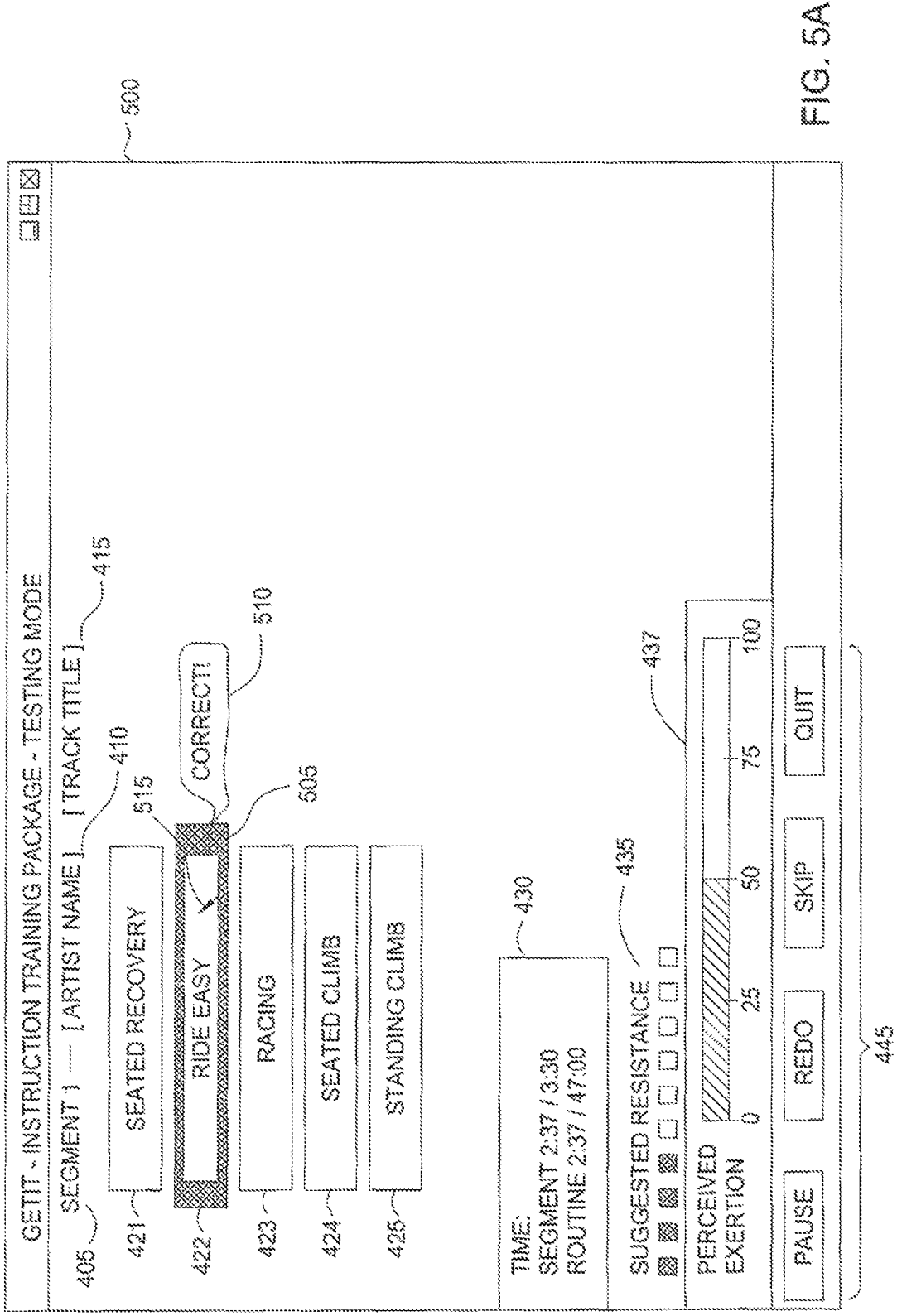
FIGS. 5A-5D illustrate a set of example graphical user interface screens for testing instructor proficiency with a training routine, according to one embodiment of the invention.

First, FIG. 5A illustrates a screen 500 presented during a testing mode provided by the training application. As shown, screen 500 includes buttons 421, 422, 423, 424, and 425, which a user may click to indicate when the user believes a transition should occur from one exercise activity to another. Screen 500 also includes the time panel 430, the suggested resistance panel 435, the perceived exertion panel 437 described above in conjunction with FIGS. 4A-4C. Note, however, in the testing mode shown in FIG. 5A, the time panel 430 includes the segment timer and the routine timer, but does not include the countdown timer used to indicate how long until the next transition. Screen 500 also includes control buttons 445 used to pause a training session, redo a particular training segment, skip a particular training segment and to quit a training session.

As shown, screen 500 is presented two minutes and thirty-seven seconds into the first segment of the example cycling routine. Accordingly, screen 500 corresponds to a point in the choreographed routine where the instructor should tell class participants to transition to a "ride easy" exercise activity following a high-exertion "standing climb." In this example, the user has clicked on the "ride easy" button 422 using a mouse cursor 515 within the appropriate time frame. In response, the training application highlights button 422, e.g., with a green bounding box 450 to indicate that the user selected the correct transition at the correct time. Additionally, the training application may be configured to display a visual cue 510 informing the user of a correct transition selection. In one embodiment, the bounding box 505 may be rendered using different colors to indicate how closely to the exact transition time the user selected the transition. For example, if the user selects the correct transition within +/−1 second of the transition time, a green bounding box may be displayed; within +/−2 seconds of the transition time, a yellow bounding box may be displayed; and within +/−3 or more seconds of the transition time, a red bounding box may be displayed. Of course the actual time frames may be tailored for a particular group exercise routine. Additionally, once displayed, the bounding box may fade from view after a few seconds.

Figure 5B:
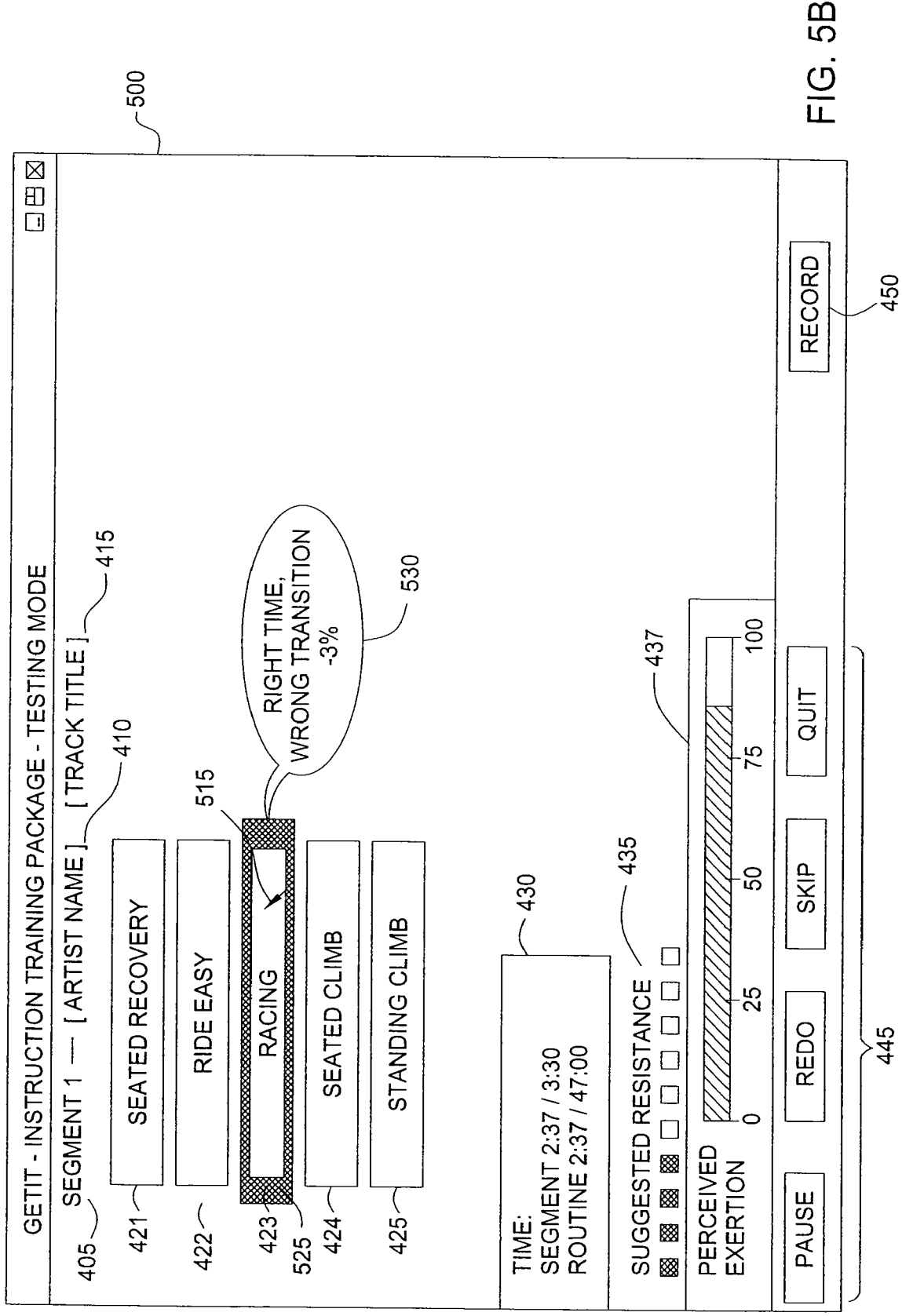

FIG. 5B illustrates a second view of the graphical interface screen 500. In contrast to the example depicted in FIG. 5A, however, FIG. 5B illustrates a scenario where the user has selected the "racing" button 423 using the mouse cursor 515. Although selected at the correct transition time (at a time index of 2:37 in segment 1), this is not the transition specified by the example cycling routine. Thus, the training application responds by displaying a red bounding box 525 around the "racing" button 423. Also, in this example, a visual cue 530 is used to indicate the selection of an incorrect transition along with a resulting three-percent reduction in a proficiency score being determined for this segment. Alternatively, the visual cue could also indicate which transition the user should have selected. Of course, what information is presented in visual cue 530 may be tailored to be appropriate for a given exercise routine.

Figure 5C:
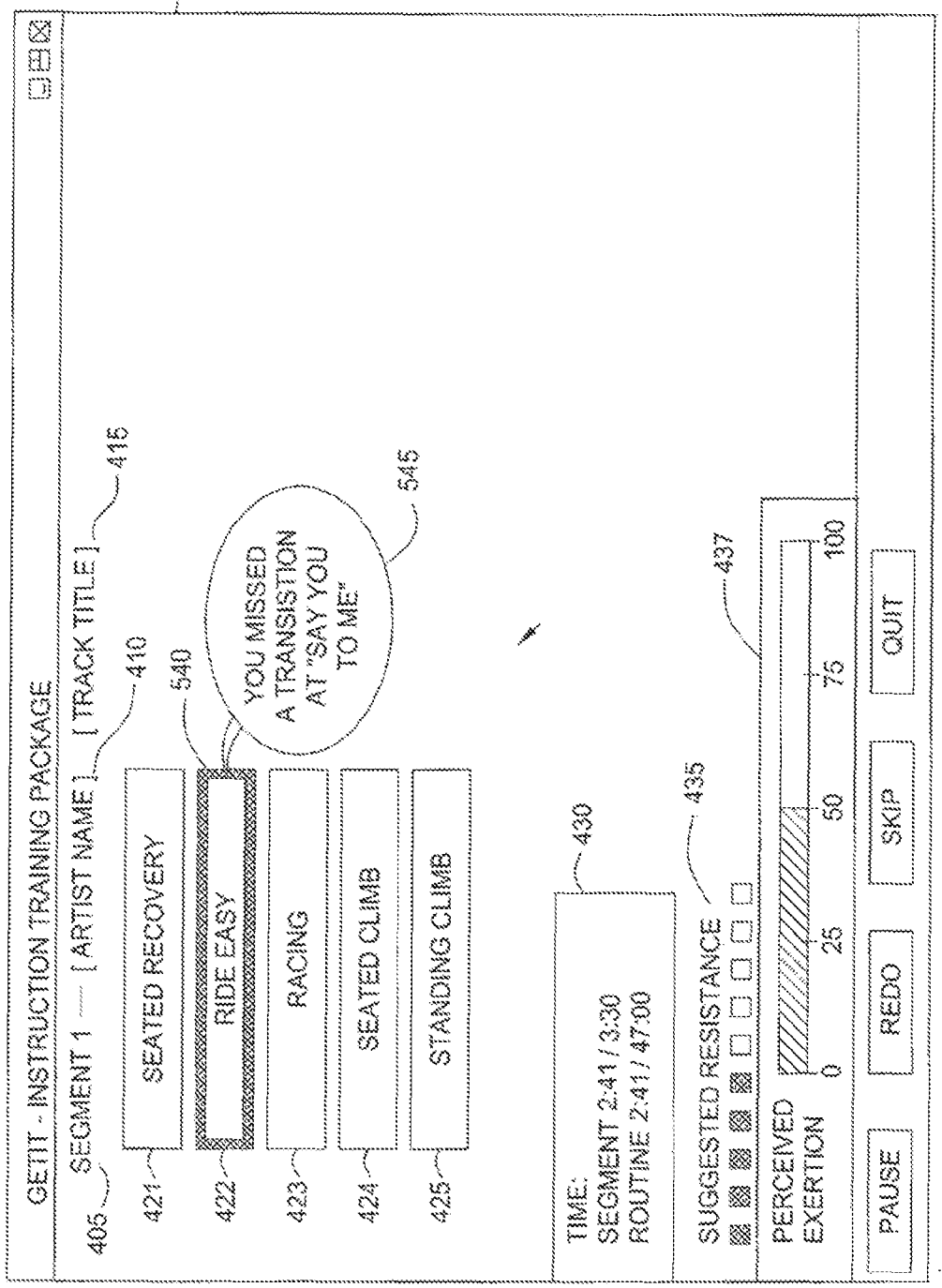

FIG. 5C illustrates a third view of the graphical interface screen 500. In this scenario, the user fails to select any transition at the appropriate transition time. In response, the training application highlights button 422 with a red bounding box to indicate the missed transition. In one embodiment, the bounding box 540 may be displayed after a specified period of time has elapsed following the actual transition time. In this example, the time panel 430 indicates a time index of 2:41 in the musical track of segment 1. That is, more than three seconds have elapsed from the transition time of 2:37. Additionally, the training application displays a visual cue 545 informing the user of a missed transition. In this particular case, the visual cue 545 informs the user of the missed transition, as well as displays the lyrics associated with that transition and which activity should have been selected. Doing do may help reinforce the correct transition time and choice for the user in subsequent training sessions.

Figure 5D:
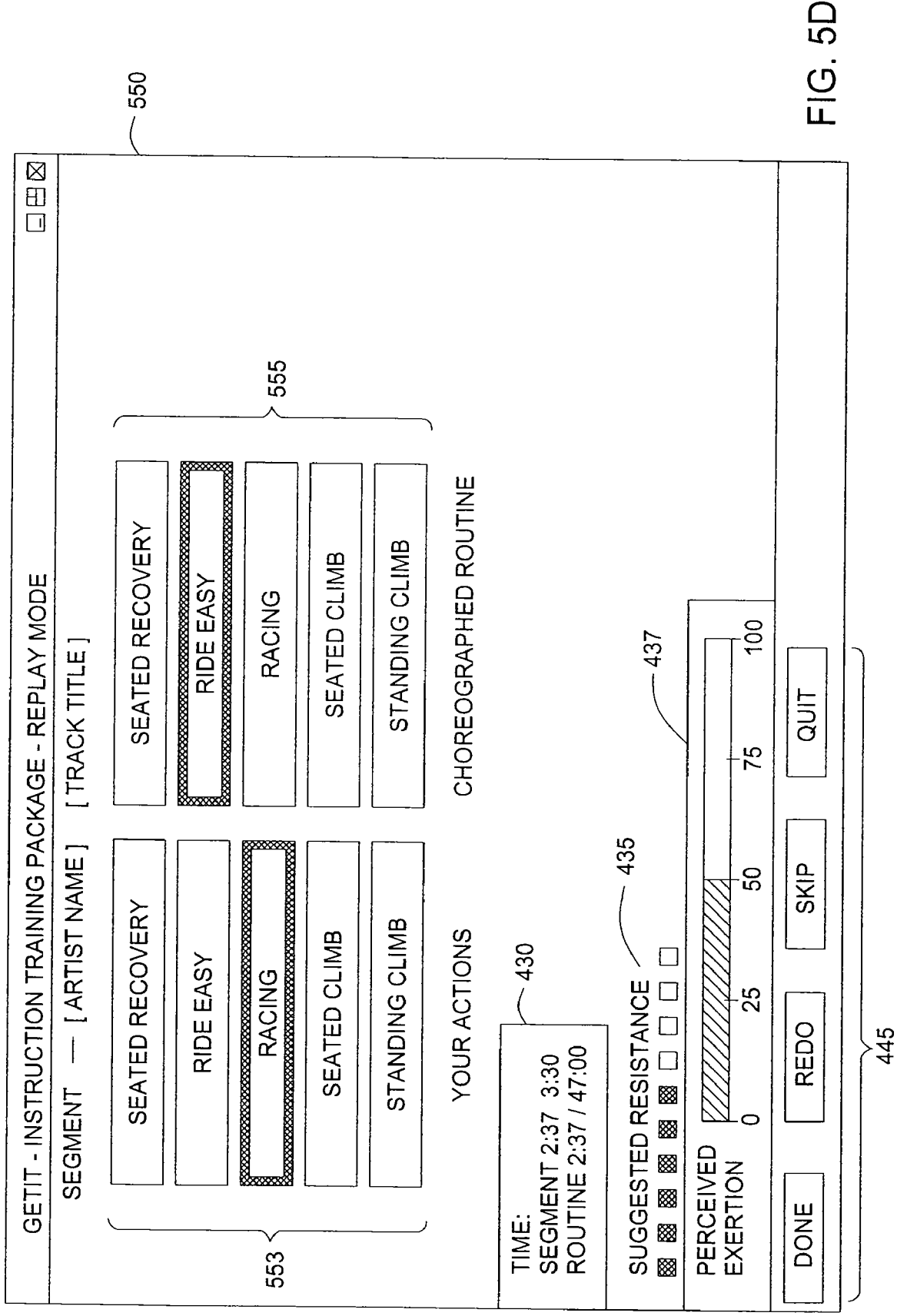

As described above, a user may record their interaction with the graphical user interface provided by the training application (e.g., using the "record" button 450 shown in FIGS. 4A-4C). In one embodiment, a recorded training (or testing) session may be replayed to the user to help identify areas where the user needs additional practice as well as to reinforce the correct transition times. For example, FIG. 5D illustrates a graphical user interface screen 550 displaying a replay mode of the training application, according to one embodiment of the invention. As shown, screen 550 includes a list of transitions 553 labeled "your actions" and a list of transitions 555 labeled "choreographed routine." Illustratively, screen 550 is replaying the point in the exercise routine at a time index of 2:41 into the musical track of segment 1. That is, screen 550 corresponds to a replay of FIG. 5B where the user selected the incorrect transition at the correct time. Accordingly, the list 553 includes a red bounding box around the "racing" transition (indicating the incorrect selection made by the user) as well as a green bounding box around the "ride easy" transition (indicating the selection specified by the choreographed routine).

Screen 550 also includes a set of control buttons 445 which may be used to pause a training session being replayed, jump to the recording of a particular training segment, skip the recoding of a particular training segment, or to quit replay mode.

FIG. 6 illustrates an example graphical user interface screen 600 presenting results of testing instructor proficiency with a training routine, according to one embodiment of the invention. As shown, screen 600 presents a user with an overall score 645 calculated in this case as an average of the scores for each segment, and the scores 610 obtained by the user for each individual track. Additionally, screen 600 includes a button 615 used to exit the performance review screen, a test button 620 used to return to testing mode, and a train button 625 used to return to a training mode.

Advantageously, as described herein, embodiments of the invention may be used to both train and test instructor proficiency with a group exercise training routine. For example, as shown in FIGS. 4A-4C and FIGS. 5A-5D, a user may be presented with a graphical user interface along with a playback of the audio tracks included with a given group exercise routine. In a training mode, the graphical user interface may display visual cues indicating upcoming transitions from one activity to another. In response, the user may perform an action (e.g., clicking a button with a mouse cursor) to select the transition at the appropriate time. In a testing mode, the graphical user interface may display an indication of whether the correct selections are made, as well as made at the right time. Further, in testing mode, user selections may be used to determine an overall measure of user proficiency with a training routine, as well as identify portions of the routine where the user may need additional training in order to become efficient with that routine. This approach allows the user to rapidly develop substantial proficiency with the exercise routine.

While the foregoing is directed to embodiments of the present invention, other and further embodiments of the invention may be devised without departing from the basic scope thereof, and the scope thereof is determined by the claims that follow.

What is claimed is:

1. A computer-implemented method for improving instructor proficiency with leading a group of participants through a choreographed training routine without engaging in the choreographed training routine, the method comprising:
   receiving a selection of a choreographed training routine, wherein the choreographed training routine provides a group exercise activity led by the instructor;
   retrieving the choreographed training routine, wherein choreographed training the routine specifies at least one audio track and, for each audio track, specifies a plurality of time indexes each indicating when an activity transition should occur from one specified activity to another specified activity as part of the choreographed training routine;
   generating a graphical user interface display presenting a selectable list of the activity transitions specified in the choreographed training routine;
   initiating playback of the at least one audio track; and
   during playback, prior to reaching a time index corresponding to an upcoming transition, generating a first visual cue indicating the upcoming transition to the instructor; and
   following playback:
      upon determining the instructor selected a threshold number of incorrect activity transitions during playback, re-presenting the selectable list of the activity transitions specified in the choreographed training routine, and
      replaying the at least one audio track at time indexes corresponding to the incorrect transitions selected by the user.

2. The method of claim 1, further comprising, during playback:
   receiving an instructor selection of one of the list of activities specified by the choreographed training routine;
   upon determining the instructor selected the upcoming transition, presenting a visual cue on the graphical user interface indicating a correct selection; and
   upon determining the instructor did not select the upcoming transition, presenting a visual cue on the graphical user interface indicating an incorrect selection.

3. The method of claim 1, further comprising:
   upon determining the instructor did not select one of the list of activities specified by the choreographed training routine within a specified time frame either before or after the time index of the upcoming transition, presenting a second visual cue on the graphical user interface indicating that the instructor missed the upcoming transition.

4. The method of claim 1, wherein the first visual cue includes a refrain of the audio track that occurs at the time index of the upcoming transition.

5. The method of claim 1, wherein the first visual cue is animated to appear to move toward an activity on the list of activities specified by the choreographed training routine which corresponds to the upcoming transition.

6. The method of claim 1, wherein the first visual cue includes a countdown timer indicating how much time is going to elapse prior to the time index corresponding to the upcoming transition.

7. The method of claim 1, wherein the first visual cue appears on the graphical user interface proximate to the entry on the list corresponding to the upcoming transition for a specified time period before, and after, the time index of the upcoming transition.

8. The method of claim 1, wherein each of the specified activities comprises an exercise activity to be performed by the group of the participants during the group exercise class.

9. The method of claim 8, wherein the group exercise class is a cycling class, and wherein the transitions specify at least one of a transitions between a plurality of riding positions, a plurality of cycling-equipment resistance settings, and a riding pace.

10. A computer-readable storage medium containing a program, which, when executed by a processor performs an operation for improving instructor proficiency with leading a group of participants through a choreographed training routine without engaging in the choreographed training routine, the operation comprising:

receiving a selection of a choreographed training routine, wherein the choreographed training routine provides a group exercise activity led by the instructor;

retrieving the choreographed training routine, wherein choreographed training the routine specifies at least one audio track and, for each audio track, specifies a plurality of time indexes each indicating when an activity transition should occur from one specified activity to another specified activity as part of the choreographed training routine;

generating a graphical user interface display presenting a selectable list of the activity transitions specified in the choreographed training routine;

initiating playback of the at least one audio track;

during playback, prior to reaching a time index corresponding to an upcoming transition, generating a first visual cue indicating the upcoming transition to the instructor; and following playback:

upon determining the instructor selected a threshold number of incorrect activity transitions during playback, re-presenting the selectable list of the activity transitions specified in the choreographed training routine, and replaying the at least one audio track at time indexes corresponding to the incorrect transitions selected by the user.

11. The computer-readable storage medium of claim 10, wherein the operation further comprises:

receiving an instructor selection of one of the list of activities specified by the choreographed training routine;

upon determining the instructor selected the upcoming transition, presenting a visual cue on the graphical user interface indicating a correct selection; and upon determining the instructor did not select the upcoming transition, presenting a visual cue on the graphical user interface indicating an incorrect selection.

12. The computer-readable storage medium of claim 10, wherein the operation further comprises:

upon determining the instructor did not select one of the list of activities specified by the choreographed training routine within a specified time frame either before or after the time index of the upcoming transition, presenting a second visual cue on the graphical user interface indicating that the instructor missed the transition.

13. The computer-readable storage medium of claim 10, wherein the first visual cue includes a refrain of the audio track that occurs at the time index of the upcoming transition.

14. The computer-readable storage medium of claim 10, wherein the first visual cue is animated to appear to move toward an activity on the list of activities specified by the choreographed training routine which corresponds to the upcoming transition.

15. The computer-readable storage medium of claim 10, wherein the first visual cue includes a countdown timer indicating how much time is going to elapse prior to the time index corresponding to the upcoming transition.

16. The computer-readable storage medium of claim 10, wherein the first visual cue appears on the graphical user interface proximate to the entry on the list corresponding to the upcoming transition for a specified time period before, and after, the time index of the upcoming transition.

17. The computer-readable storage medium of claim 10, wherein each of the specified activities comprises an exercise activity to be performed by each of the participants during the group exercise class.

18. The computer-readable storage medium of claim 17, wherein the group exercise class is a cycling class, and wherein the transitions specify at least one of a transitions between a plurality of riding positions, a plurality of cycling-equipment resistance settings, and a transition from a first riding pace to a second riding pace.

19. A system, comprising:

a processor; and a memory containing a program, which, when executed by the processor is configured to perform an operation for improving instructor proficiency with leading a group of participants through a choreographed training routine without engaging in the choreographed training routine, the operation comprising:

receiving a selection of a choreographed training routine, wherein the choreographed training routine provides a group exercise activity led by the instructor, retrieving the choreographed training routine, wherein choreographed training the routine specifies at least one audio track and, for each audio track, specifies a plurality of time indexes each indicating when an activity transition should occur from one specified activity to another specified activity as part of the choreographed training routine, generating a graphical user interface display presenting a selectable list of the activity transitions specified in the choreographed training routine, initiating playback of the at least one audio track, during playback, prior to reaching a time index corresponding to an upcoming transition, generating a first visual cue indicating the upcoming transition to the instructor, following playback:

upon determining the instructor selected a threshold number of incorrect activity transitions during playback, re-presenting the selectable list of the activity transitions specified in the choreographed training routine; and replaying the at least one audio track at time indexes corresponding to the incorrect transitions selected by the user.

20. The system of claim 19, wherein the operation further comprises:

receiving an instructor selection of one of the list of activities specified by the choreographed training routine;

upon determining the instructor selected the upcoming transition, presenting a visual cue on the graphical user interface indicating a correct selection; and upon determining the instructor did not select the upcoming transition, presenting a visual cue on the graphical user interface indicating an incorrect selection.

21. The system of claim 19, wherein the operation further comprises:

upon determining the instructor did not select one of the list of activities specified by the choreographed training routine within a specified time frame either before or after the time index of the upcoming transition, presenting a second visual cue on the graphical user interface indicating that the instructor missed the upcoming transition.

22. The system of claim 19, wherein each of the specified activities comprises an exercise activity to be performed by each of the participants during the group exercise class.

23. The system of claim 22, wherein the group exercise class is a cycling class, and wherein the transitions specify at least one of a transitions between a plurality of riding positions, a plurality of cycling-equipment resistance settings, and a transition from a first riding pace to a second riding pace.

24. A method for evaluating instructor proficiency with leading a group of participants through a choreographed training routine without requiring the instructor perform the choreographed training routine, the method comprising:
receiving a selection of a choreographed training routine, wherein the choreographed training routine provides a group exercise activity led by the instructor;
retrieving the choreographed training routine, wherein choreographed training the routine specifies at least one audio track and, for each audio track, specifies a plurality of time indexes each indicating when an activity transition should occur from one specified activity to another specified activity as part of the choreographed training routine,
generating a graphical user interface display presenting a selectable list of the activity transitions specified in the choreographed training routine;
initiating playback of the at least one audio track;
during playback, upon reaching each respective time index corresponding to one of the transitions, determining whether the instructor selected one of the activity transitions from the list within a specified time frame either before or after the time index; and
based on the determinations, assigning a proficiency score to the instructor for each of one of more portions of the choreographed training routine.

25. The method of claim 24, further comprising:
presenting a visual cue on the graphical user interface for each correct selection of a specified activity at a corresponding time index; and
presenting a visual cue on the graphical user interface for each incorrect selection of a specified activity.

26. The method of claim 24, further comprising, presenting a visual cue on the graphical user interface indicating a missed transition.

27. The method of claim 24, wherein each of the specified activities comprises an exercise activity to be performed by each of the participants during the group exercise class.

28. The method of claim 27, wherein the group exercise class is a cycling class, and wherein the transitions specify at least one of a transitions between a plurality of riding positions, a plurality of cycling-equipment resistance settings, and a riding pace.

* * * * *